US008625238B2

(12) United States Patent
Ritzinger

(10) Patent No.: US 8,625,238 B2
(45) Date of Patent: Jan. 7, 2014

(54) GROUND-FAULT CIRCUIT INTERRUPTER

(75) Inventor: Georg Ritzinger, Zeiselmauer-Wolfpassing (AT)

(73) Assignee: Eaton GmbH, Schrems (AT)

( * ) Notice: Subject to any disclaimer, the term of this patent is extended or adjusted under 35 U.S.C. 154(b) by 233 days.

(21) Appl. No.: 13/086,913

(22) Filed: Apr. 14, 2011

(65) Prior Publication Data
US 2012/0087050 A1  Apr. 12, 2012

Related U.S. Application Data

(60) Provisional application No. 61/324,074, filed on Apr. 14, 2010.

(30) Foreign Application Priority Data

Apr. 14, 2010  (AT) .................................. A 595/2010

(51) Int. Cl.
*H02H 9/08*  (2006.01)
(52) U.S. Cl.
USPC .......................................................... 361/42
(58) Field of Classification Search
USPC .......................................................... 361/42
See application file for complete search history.

(56) References Cited

U.S. PATENT DOCUMENTS 4,833,564 A   5/1989  Pardue et al.
6,590,380 B2 * 7/2003  Edel .............................. 324/127

FOREIGN PATENT DOCUMENTS

| DE | 10 2004 056 976 | 6/2005 |
| DE | 10 2005 008 431 | 10/2005 |
| DE | 10 2004 024 100 | 12/2005 |
| GB | 2251741 A | 7/1992 |
| GB | 2269064 A | 1/1994 |
| WO | WO 02/054557 A1 | 7/2002 |

* cited by examiner

Primary Examiner — Scott Bauer
(74) Attorney, Agent, or Firm — Henry M. Feiereisen LLC

(57) ABSTRACT

A ground-fault circuit interrupter has a test circuit for generating a test fault current. The test circuit includes a test button, a first test resistor, and a regulating circuit constructed to generate a test fault current with a predetermined and substantially constant value independent of an applied voltage of an electrical network to be protected. The test button, the first test resistor and the regulating circuit are connected in series between phases of the electrical network.

13 Claims, 1 Drawing Sheet

GROUND-FAULT CIRCUIT INTERRUPTER

CROSS-REFERENCES TO RELATED APPLICATIONS

This application claims the benefit of prior filed U.S. provisional Application No. 61/324,074, filed Apr. 14, 2010, pursuant to 35 U.S.C. 119(e), the content of which is incorporated herein by reference in its entirety as if fully set forth herein.

This application also claims the priority of Austrian Patent Application, Serial No. A 595/2010, filed Apr. 14, 2010, pursuant to 35 U.S.C. 119(a)-(d), the content of which is incorporated herein by reference in its entirety as if fully set forth herein.

BACKGROUND OF THE INVENTION

The present invention relates to a ground-fault circuit interrupter.

The following discussion of related art is provided to assist the reader in understanding the advantages of the invention, and is not to be construed as an admission that this related art is prior art to this invention.

Ground-fault circuit interrupters are provided for the purpose of triggering in the case of the occurrence of a fault current of a specific level and disconnecting an electrical subnetwork from a power supply network in this way. Various aging procedures, such as change or worsening of the magnetic properties of a summation current transformer, can have the result that the fault current required for triggering the ground-fault circuit interrupter rises over time. This typically remains unnoticed by a user for a long time. The user does have the possibility of monitoring the function of the ground-fault circuit interrupter using the test unit, however, a simulated test fault current is typically generated by such a test unit, or at least in the case of typical ground-fault circuit interrupters which are independent of the network voltage, the test fault current being significantly higher than the rated fault current of the relevant ground-fault circuit interrupter. Therefore, the correct functioning in case of fault cannot be concluded from a successful test of a ground-fault circuit interrupter. In addition, in the typical test unit, in particular in the case of ground-fault circuit interrupters independent of the network voltage, the level of the actually generated test fault current is a function of the currently applied network voltage, which is naturally subject to certain unpredictable variations. "Old" ground-fault circuit interrupters therefore possibly represent a hazard to living beings and facilities, it currently not being able to be established by a user whether a specific installed ground-fault circuit interrupter still offers protection.

It would therefore be desirable and advantageous to obviate prior art shortcomings by providing an improved ground-fault circuit interrupter, wherein the functional reliability can be checked more precisely, in particular independently of the network voltage.

SUMMARY OF THE INVENTION

According to one aspect of the present invention, a ground-fault circuit interrupter has a test circuit for generating a test fault current. The test circuit includes a test button, a first test resistor, and a regulating circuit constructed to generate a test fault current with a predetermined and substantially constant value independent of an applied voltage of an electrical network to be protected. The test button, the first test resistor and the regulating circuit are connected in series between phases of the electrical network.

The actual function or functional reliability of the ground-fault circuit interrupter in case of fault can thus be concluded from a successful test of a ground-fault circuit interrupter using the corresponding test unit. Therefore, a precisely defined test fault current can be generated independently of the respective applied network voltage. It can thus be ensured that in case of a successful test of the ground-fault circuit interrupter using its test unit, the relevant ground-fault circuit interrupter also triggers in case of an actually occurring fault current at the provided value of the fault current, therefore, the so-called rated fault current.

Additional advantageous embodiments of the present invention may include one or more of the following features.

According to one advantageous feature of the present invention, the test fault current may be in phase with a current of the electrical network to be protected.

According to one advantageous feature of the present invention, the regulating circuit may have a controlled resistor, for example a transistor or a field-effect transistor, for adapting the test fault current. The controlled resistor may be connected in series with the first test resistor.

According to one advantageous feature of the present invention, the regulating circuit may include a DC voltage amplifier for controlling the controlled resistor, wherein the DC voltage amplifier may be implemented as an operational amplifier.

According to one advantageous feature of the present invention, the regulating circuit may include a full-wave rectifier, wherein the field-effect transistor is connected to DC terminals of the full-wave rectifier. The regulated voltage supply may be connected to the DC terminals of the full-wave rectifier and to the DC voltage amplifier.

According to one advantageous feature of the present invention, the regulating circuit may include a voltage divider connected in parallel with the first test resistor and the controlled resistor. A tap of the voltage divider may be connected to a first input of the DC voltage amplifier, and the test fault current may be applied to a second input of the DC voltage amplifier.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
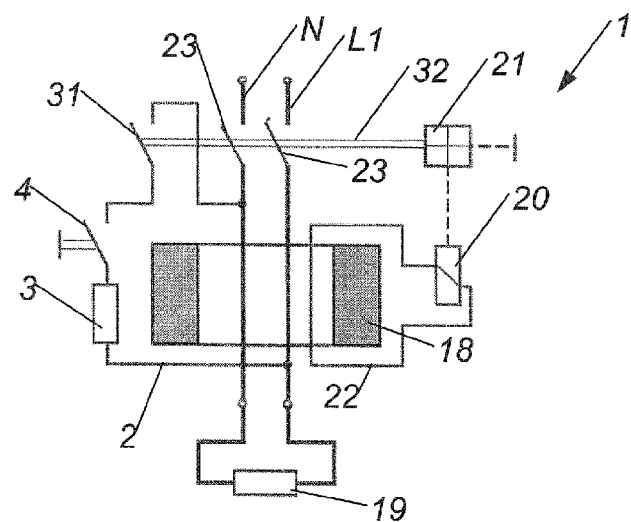
FIG. 1 shows a schematic view of a conventional ground-fault circuit interrupter.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now first to FIG. 1, there is shown in form of a schematic diagram a conventional ground-fault circuit interrupter 1, for fault current triggering independent of the network voltage. Such a ground-fault circuit interrupter 1 is provided for protecting facilities and people, in case of an occurring hazardous fault current, the consumer or load 19 connected to the ground-fault circuit interrupter 1 being disconnected from a supply network, comprising the first conductor N and the second conductor L1. The ground-fault circuit interrupter 1 has connecting terminals, in particular screw connecting terminals, for connecting at least one first and one second conductor N, L1 of an electrical supply network. The schematic circuit diagram shown according to FIG. 1 shows an embodiment only having a first and a second conductor N, L1. Disconnecting contacts 23, therefore switch contacts which are provided or implemented for disconnecting or interrupting the first or second conductor N, L1, and for subsequently closing them, are located in the first and second conductors N, L1.

The described components or assemblies shown in FIG. 1 are located together in an insulating material housing, which has passages at least for the connecting terminals and a manually operable manual switch lever for manually opening or closing the disconnecting contacts 23. Furthermore, it can be provided that the ground-fault circuit interrupter 1 has further assemblies or components—not shown or described—such as a switch position display, a trigger display, and the like. Furthermore, FIG. 1 shows an exemplary load 19, meaning an electrical consumer.

Figure 2:
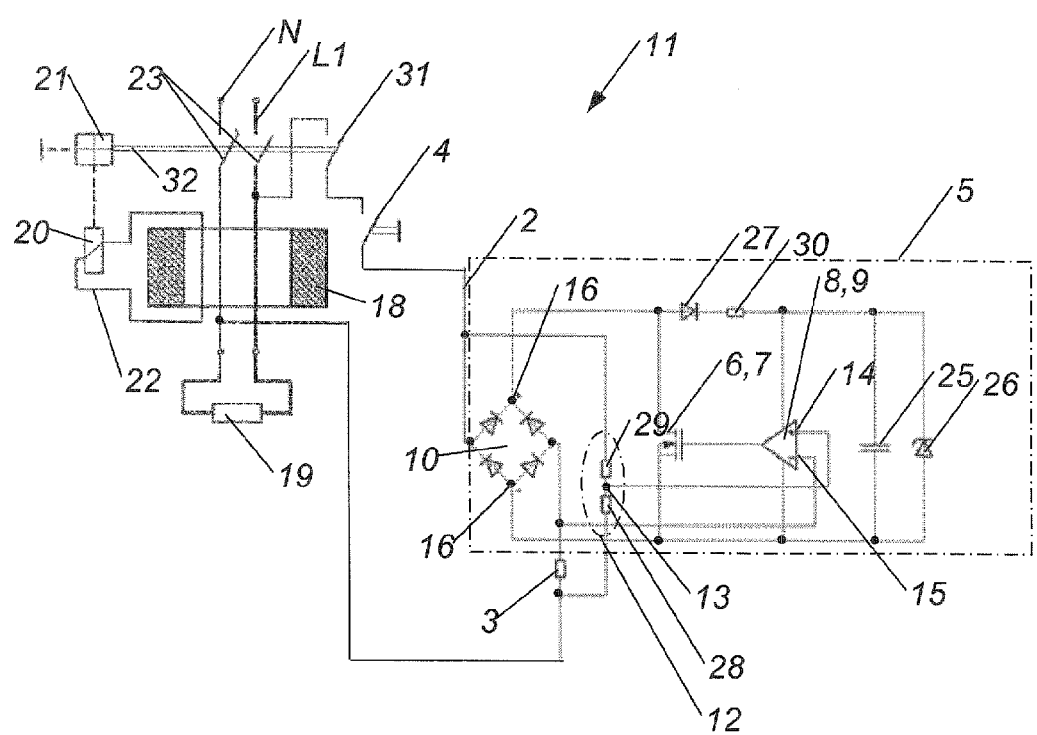
FIG. 2 shows a schematic view of a preferred embodiment of a ground-fault circuit interrupter according to the present invention.

FIG. 2 shows an advantageous embodiment of a ground-fault circuit interrupter 11 according to the invention, the fundamental construction of the ground-fault circuit interrupter 11 being substantially identical to the ground-fault circuit interrupter 1 according to FIG. 1, except for the additions made to the test circuit 2.

The ground-fault circuit interrupter 11 in FIG. 2 has a test circuit 2 for generating a test fault current, this test circuit 2 having at least one test resistor 3 and one test button 4, the test circuit 2 having a regulating circuit 5, and the regulating circuit 5 is implemented in such a way that a test fault current generated by the test circuit 2—essentially independently of the applied voltage of an electrical network to be protected—has a predetermined and essentially constant value.

Therefore, the actual function or functional reliability of the ground-fault circuit interrupter 11 in case of fault can be concluded from a successful test of the ground-fault circuit interrupter 11 using the corresponding test unit or the test circuit 2. Therefore, a precisely defined test fault current can be generated independently of the respective applied network voltage. It can thus be ensured that in case of a successful test of the ground-fault circuit interrupter 1 using its test circuit 2, the relevant ground-fault circuit interrupter 11 also triggers in case of an actually occurring fault current at the provided value of the fault current, therefore the so-called rated fault current.

A ground-fault circuit interrupter 11 according to the invention can be any type of ground-fault circuit interrupter, which can particularly have functionalities and assemblies other than those described in the present invention. Similar to the ground-fault circuit interrupter 1 shown in FIG. 1, the ground-fault circuit interrupter 11 according to the invention is advantageously constructed for use on an electrical network having two conductors N, L1. However, embodiments having any specifiable number of lines or conductors, for example, three or four, of an electrical power supply network or power distribution network can be provided.

The ground-fault circuit interrupter 11 according to the invention has a device for detecting a fault current, it preferably being provided that this device is implemented as a summation current transformer 18, as shown in FIG. 2. According to the illustrated particularly preferred embodiment of a ground-fault circuit interrupter 11 according to the invention, it has at least one summation current transformer 18, through which at least one first conductor N and one second conductor L1 of an electrical network to be protected are guided, at least one secondary winding 22 being located on the summation current transformer 18, the secondary winding 22 being connected in a circuit with a trigger 20.

The summation current transformer 18 has a transformer core, comprising a magnetic material, through which at least the first and second conductors N, L1 are guided as the primary winding. The term "guided through the summation current transformer 18" relates in this case to the typical embodiment of the summation current transformer 18 having a ring-shaped transformer core, which has an opening, through which the relevant conductors are guided. Preferably, these conductors are further guided or wound at least once around the cross-section of this "ring".

Furthermore, a secondary winding 22 for detecting a fault current signal is located on the summation current transformer 18, which is preferably formed by a conductor, such as a thin wire, wound multiple times around the cross-section of the "ring". The secondary winding 22 is connected in a circuit at least indirectly with a trigger 20, which is preferably implemented as a permanent magnet trigger, whereby a particularly reliable and rapid response of the ground-fault circuit interrupter 11 can be achieved. The trigger 20 acts mechanically via a breaker latching mechanism 21 on disconnecting contacts 23. Upon the occurrence of a hazardous fault current, a corresponding fault current signal is generated in the secondary winding 22, and the trigger 20 acts on the disconnecting contacts 23, which are opened, and the first and second conductors N, L1 or optionally the third and fourth conductors. Designs of a trigger 20 deviating therefrom, for example, a trigger which is dependent on the network voltage, can also be provided.

Furthermore, a ground-fault circuit interrupter 11 according to the invention has a test circuit 2, which is implemented and provided for the purpose of generating a simulated test fault current.

The test circuit 2 connects the first conductor N to the second conductor L1, this connection line not being guided through the summation current transformer 18, but rather "externally" past it. The test circuit 2 is not closed in normal operation of the ground-fault circuit interrupter 11; current therefore does not flow in this test circuit 2. The test circuit 2 has a test button 4 to close it.

Furthermore, the test circuit 2 has at least one first test resistor 3. As defined in the present invention, a resistor which essentially acts as a purely ohmic resistor, or acts as a purely ohmic resistor at least at the frequency of the network to be protected, is referred to as a test resistor 3.

According to the embodiments shown in FIGS. 1 and 2, the test circuit 2 furthermore has a so-called test circuit disconnecting contact 31 which is mechanically connected to the breaker latching mechanism 21 or the further disconnecting contacts 23 and is also opened upon opening of the disconnecting contacts 23. This can prevent current from continuing to flow via the test circuit 2 and the first test resistor 3 in case of actuation of the test button 4 and already completed triggering of the ground-fault circuit interrupter 1, 11. Such a current which continues to flow would result in significant power losses on the first test resistor 3, which could result in thermal destruction of the test resistor or resistors 3. This can be reliably prevented by the test circuit disconnecting contact 31, and the first test resistor 3 or the control resistor 6 can be selected as small with respect to its permissible power loss.

Ground-fault circuit interrupters 11 according to the invention are preferably implemented as ground-fault circuit interrupters 11 which are independent of a network voltage. The assemblies located in such a ground-fault circuit interrupter 11, which is independent of the network voltage, for detecting a fault current and triggering the ground-fault circuit interrupter 11, therefore disconnecting the disconnecting contacts 23, acquire their energy required for triggering completely from the fault current or the fault current signal, which is proportional thereto, in the secondary winding 22.

The test circuit 2 is connected to the first conductor N and runs up to the above-mentioned test circuit disconnecting contact 31, which is conductively connected to the test button 4. The test button 4 is further conductively connected to the first test resistor 3, whose other terminal is conductively connected to the second conductor L1.

According to the invention, the test circuit 2 has a regulating circuit 5, and the regulating circuit 5 is implemented in such a way that a test fault current generated by the test circuit 2—essentially independently of the applied voltage of an electrical network to be protected—has a predetermined and essentially constant value.

Such a regulating circuit 5 can—to induce or cause the relevant effect—be implemented in many ways. In particular, the relevant functionality can be achieved by an electronic regulating circuit or a combined hardware/software solution.

In order to achieve an accurate test of the fault current triggering in the case of typical operation of a ground-fault circuit interrupter 11 according to the invention in a network having sinusoidal alternating currents, it is particularly provided that the regulating circuit 5 is implemented in such a way that the test fault current generated by the test circuit 2 is in phase with the current of the electrical network to be protected.

In particular, it is provided that the test circuit 2 has a controlled resistor 6 for adapting the test fault current. Through such a controlled resistor 6, the test fault current which actually occurs or is caused by the test circuit 2 can easily be kept at a predetermined value. The current actually flowing in the test circuit 2 can easily be limited or regulated by the regulation of the resistance value of the controlled resistor 6.

According to the advantageous embodiment shown in FIG. 2, the controlled resistor 6 is located in a circuit at least indirectly in series to the first test resistor 3, whereby particularly simple regulation of the total active test resistance, which is composed of the first test resistor 3 and the controlled resistor 6, is possible.

The controlled resistor 6 can be implemented as any type of an electrical component which has a resistance having ohmic component, whose resistance value can be controlled or influenced in a predefinable way. It is preferably provided, for example, that the controlled resistor 6 is implemented as a transistor, in particular as a field-effect transistor 7. Control of the resistance value using very low power is possible in particular by implementing the controlled resistor as a field-effect transistor 7. The construction of the regulating circuit 5 independently of the network voltage is thus supported.

In the case of the preferred implementation of the control resistor 6 as a field-effect transistor 7, the test circuit 2 has a full-wave rectifier 10, and the controlled resistor 6 implemented as a field-effect transistor 7 is connected in a circuit to DC terminals 16 of the full-wave rectifier 10. The use of a ground-fault circuit interrupter 1 implemented in this way on typical AC networks is thus possible, since the preferred field-effect transistors 7 are only capable of operation on direct current.

The regulating circuit 5 furthermore has corresponding means for activating the controlled resistor 6, therefore, for the predefinable and targeted change of the resistance value of the controlled resistor 6. According to the illustrated preferred embodiment, the test circuit 2 for controlling the controlled resistor 6 has a DC voltage amplifier 8, in particular an operational amplifier 9.

Furthermore, for operation of the DC voltage amplifier, the test circuit 2 includes a regulated voltage supply, which is connected in a circuit to the DC terminals 16 of the full-wave rectifier 10 and to the DC voltage amplifier 8. The maximum modulation limits possible through the DC voltage amplifier 8 can be predefined by the regulation of this voltage supply.

The active regulation of the test fault current requires a tap of the respective instantaneously applied network voltage. For this purpose, the first test resistor 3 and the controlled resistor 6 are advantageously bypassed in a circuit by a voltage divider 12. Furthermore, it is preferably provided that a tap 13 of the voltage divider 12 is connected in a circuit to a first input 14 of the DC voltage amplifier 8, and the test fault current is applied to a second input 15 of the DC voltage amplifier 8. The resistance value of the controlled resistor 6 can thus be adapted to the respective prevailing network voltage.

A preferred embodiment of a ground-fault circuit interrupter 11 according to the invention will now be described in greater detail with reference to FIG. 2.

The test circuit 2 is connected to the first conductor N and leads up to the first test resistor 3, whose further terminal is connected to both a first AC terminal of a bridge rectifier, and also to the second input 15 of a DC voltage amplifier 8, implemented as an operational amplifier 9, also referred to as opamp 9. The second input 15 of the opamp 9 is implemented as an inverting input. The second AC terminal of the bridge rectifier is connected to the test button 4, which is further connected to the test circuit disconnecting contact 31, which is in turn connected in a circuit to the second conductor L1. The first test resistor 3 and the bridge rectifier are bypassed using a voltage divider 12, the voltage divider 12 having a first and a second voltage divider resistor 28, 29, and a contact point, which is referred to as the tap 13 of the voltage divider 12, between the two voltage divider resistors 28, 29. The tap 13 is connected in a circuit to the first, non-inverting input 14 of the opamp 9. The output of the opamp 9 is connected in a circuit to the gate of the field-effect transistor 7, which is implemented as a self locking n-MOSFET. Gate and source of the relevant field-effect transistor 7 are connected to the DC terminals 16 of the bridge rectifier.

Furthermore, the relevant regulating circuit 5 has a regulated voltage supply for supplying the opamp 9. The voltage supply has a diode 27 and a series resistor 30, which are connected to the positive DC terminal 16 of the bridge rectifier. A terminal of the series resistor 30 is connected to the positive supply input of the opamp 9, and furthermore to a capacitor 25, for stabilizing and smoothing the supply voltage, and furthermore to a Zener diode 26, for regulating the supply voltage. The respectively provided further terminals of the capacitor 25 and the Zener diode 26 are connected to the negative DC terminal 16 of the bridge rectifier, as is the negative supply input of the opamp.

A ground-fault circuit interrupter 1 constructed in this way is a ground-fault circuit interrupter 11 which is completely independent of the network voltage, notwithstanding the provided active components. The active components are only supplied with current if the test button 4 is closed. The regulating circuit 5 only requires a few volts of available network voltage for its function.

Upon actuation of the test button 4, current flows through the first test resistor 3. The potential following the first test resistor 3 is applied to the second input 15 of the opamp 9. Furthermore, a potential tapped from the voltage divider 12 is applied to the first input 14 of the opamp 9. A control variable is ascertained from the difference of these potentials, and controls the voltage-dependent resistor 6 which—via the pathway of the full-wave rectifier 10—is located in series to the first test resistor 3, and increases its value, whereby the test fault current is actively regulated.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A network-voltage-independent ground-fault circuit interrupter having a test circuit for generating a test fault current, the test circuit comprising:
   a test button;
   at least one first test resistor; and
   a regulating circuit constructed to generate a test fault current with a predetermined and substantially constant value independent of an applied voltage of an electrical network to be protected, wherein the regulating circuit is electrically connected with phases of the electrical network only when the test button is closed.

2. The ground-fault circuit interrupter of claim 1, wherein the test fault current is in phase with a current of the electrical network to be protected.

3. The ground-fault circuit interrupter of claim 1, wherein the regulating circuit has a controlled resistor for adapting the test fault current.

4. The ground-fault circuit interrupter of claim 3, wherein the controlled resistor is connected in series with the at least one first test resistor.

5. The ground-fault circuit interrupter of claim 3, wherein the controlled resistor is implemented as a transistor.

6. The ground-fault circuit interrupter of claim 3, wherein the transistor is implemented as a field-effect transistor.

7. The ground-fault circuit interrupter of claim 3, wherein the regulating circuit comprises a DC voltage amplifier for controlling the controlled resistor.

8. The ground-fault circuit interrupter of claim 7, wherein the DC voltage amplifier is an operational amplifier.

9. The ground-fault circuit interrupter of claim 6, wherein the regulating circuit comprises a full-wave rectifier, and wherein the field-effect transistor is connected to DC terminals of the full-wave rectifier.

10. The ground-fault circuit interrupter of claim 9, wherein the regulating circuit comprises a DC voltage amplifier for controlling the controlled resistor and a regulated voltage supply, with the regulated voltage supply being connected to the DC terminals of the full-wave rectifier and to the DC voltage amplifier.

11. The ground-fault circuit interrupter of claim 3, wherein the regulating circuit comprises a voltage divider connected in parallel with the at least one first test resistor and the controlled resistor.

12. The ground-fault circuit interrupter claim 11, wherein the regulating circuit comprises a DC voltage amplifier for controlling the controlled resistor, and wherein a tap of the voltage divider is connected to a first input of the DC voltage amplifier, and the test fault current is applied to a second input of the DC voltage amplifier.

13. The ground-fault circuit interrupter of claim 1, wherein the test button, the at least one first test resistor and the regulating circuit are connected in series between phases of the electrical network.

* * * * *